Figure 1:
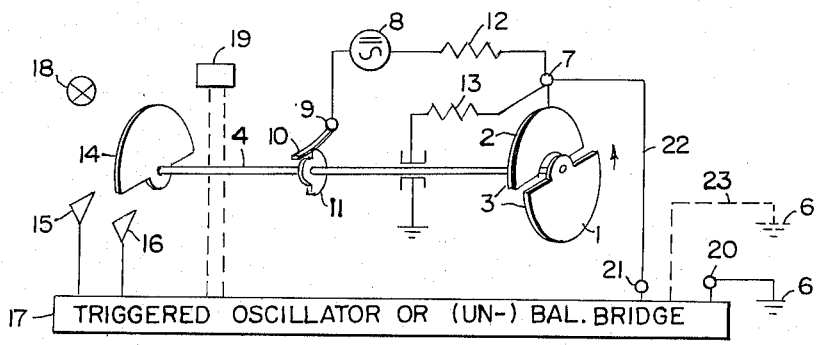

Feb. 1, 1966  H. E. STOCKMAN  3,233,157
ELECTRIC FIELD MOTOR
Filed March 31, 1961  2 Sheets-Sheet 1

INVENTOR:
HARRY E. STOCKMAN
BY,
Wolf, Greenfield + Hieken
ATTORNEYS

Feb. 1, 1966   H. E. STOCKMAN   3,233,157
ELECTRIC FIELD MOTOR

Filed March 31, 1961   2 Sheets-Sheet 2

INVENTOR
HARRY E. STOCKMAN
BY,
Wolf, Greenfield & Hieken
ATTORNEYS

United States Patent Office 3,233,157
Patented Feb. 1, 1966

3,233,157
ELECTRIC FIELD MOTOR
Harry E. Stockman, Waltham, Mass.
(72 Gray St., Arlington, Mass.)
Filed Mar. 31, 1961, Ser. No. 99,939
2 Claims. (Cl. 318—116)

This invention pertains to a direct or alternating current electric motor of brushless design, free from any kind of contacts.

More particularly, the freedom from commutation contacts is achieved by means of electric field or electronic switching, without the necessity of incorporating an amplifying system.

By this invention I desire to obtain advantages in electric motor design, such as the following: (1) To produce high-voltage-low-current motors, suitable for high-voltage-low-current sources, such as certain types of atomic batteries and radiation cells, (2) to produce a motor that runs with exceedingly small friction, so that it may operate on a current less than one microampere, thus producing rotary motion from exceedingly small signal currents, such as the currents derived from friction electricity, (3) to provide an industrial type motor that runs from atmospheric electricity, (4) to produce a motor that runs with high efficiency from a charged capacitor in the same manner as a conventional electromagnetic motor runs from a charged storage battery, (5) by means of available converters, to make possible the operation of this high voltage motor from a low-voltage electric battery.

It is an object of this invention to provide the rotation of a variable capacitor by means of an applied direct or alternating voltage, with the commutation provided (1) by some specific brush arrangement, (2) automatically, without the use of contacts of any kind.

It is another object of this invention to provide commutation with one brush only, closing the circuit when electric field attraction is desired, and leaving the necessary discharge of the charged conductor system of the variable capacitor to a resistor, shunting the variable capacitor, or by similar arrangement.

It is still another object of this invention to provide commutation with two brushes, one for closing the circuit, and the other for discharging the charged conductor of the variable capacitor, the two brushes working sequentially.

It is a further object of this invention to provide commutation by the change in electric field produced by the rotating rotor of the variable capacitor, said change in the electric field actuating a spark gap, a gas discharge tube, or the like, so as to apply or remove the driving voltage across the variable capacitor.

It is a still further object of this invention to provide brushless commutation of the variable capacitor motor by capacitive or other triggering of a tube oscillator, transistor oscillator, or other oscillator, so that the produced oscillator voltage, or a voltage derived from it, becomes automatically applied as driving voltage to the motor during the desired driving interval.

It is a specific object of this invention to provide commutation by the use of the variable capacitor as a tuning element in a storage element network in such a manner that the repeated change in capacitance causes oscillations to commence and cease, so that the ensuing oscillation voltage, or a voltage derived from it, automatically becomes applied to the motor as driving voltage during the proper driving intervals.

It is a more specific object of this invention to provide commutation by the utilization of the part $v dC/dt$ of the total derivative $d(Cv)/dt$, signifying parametric operation with the reduction in driving voltage due to the increase in capacitance during rotation automatically delayed so that a double-valued force function results, yielding rotation.

It is an important object of this invention to provide commutation by the interception, reflection, or other modulation of a light beam so as to not only trigger a transistor, or other oscillator, to provide the desired driving voltage at desired intervals, but also to furnish this amplifier its total operational power so that no other source for operation becomes necessary.

According to the invention, electromechanical transducing apparatus comprises a controllable potential source having first and second terminals. Means defining first and second conducting surfaces are supported for relative movement therebetween, a first position of relatively low capacity established by said first and second conducting surfaces and a second position of capacity higher than said relatively low capacity. Means continuously connect the potential source first and second terminals to the first and second conducting surfaces, respectively, to establish an electric field therebetween when the potential source establishes a potential between the first and second terminals. Means responsive to the relative position between the first and second conducting surfaces deliver control signals to the potential source to change the potential between the first and second terminals in synchronism with relative movement between the first and second conducting surfaces.

Preferably the first and second conducting surfaces are relatively rotatable about an axis. According to one aspect of the invention, means define third and fourth conducting surfaces arranged for relative rotation therebetween about this axis of rotation with the third surface stationary with respect to but angularly displaced about this axis from the first surface, and means couple the potential source first and second terminals to respective ones of the third and fourth surfaces to effect relative movement between the first surface and the second surface and between the third surface and the fourth surface whenever the potential difference between the first and second terminals changes from zero to a predetermined magnitude.

In accordance with a feature of the invention, means responsive to the relative position between the first and second conducting surfaces comprises changeable impedance means responsive to a reference one of the relative positions between the first and second means for presenting a low impedance between the first and second potential source terminals and thereafter presenting a high impedance between these terminals. The changeable impedance means may comprise means defining an electrical discharge path between the first and second terminals which path conducts heavily in response to relative movement between said path and one of the conducting surfaces and thereafter returns to a substantially nonconducting state.

The potential source may comprise amplifying means responsive to a triggering signal for providing a high potential between the first and second terminals during selected time intervals synchronously related to the relative movement between the first and second conducting surfaces. Means responsive to a reference one of the relative positions between first and second surfaces may provide a triggering signal on each occurrence of the reference position and means provided for coupling each triggering signal to the amplifying means. The amplifying means may comprise an oscillatory circuit normally providing an A.-C. signal, and means may be provided responsive to the triggering signal for blocking the A.-C. signal for a number of spaced time intervals corresponding to the number of the trigger pulses. The first and second conducting surfaces may comprise the frequency controlling capacity of the oscillatory circuit and assume a relative position establishing a capacity effective in extinguishing oscillations of the oscillatory circuit.

According to another aspect of the invention, the potential source may comprise radiant energy transducing means responsive to incident radiant energy for providing an electrical potential between the first and second terminals. A source of this radiant energy may be provided normally directed upon the radiant energy transducing means, and means responsive to the relative position between the first and second conducting surfaces may block this radiant energy from impinging upon the radiant energy transducing means when the first and second conducting surfaces assume a reference one of relative positions.

Figure 4:
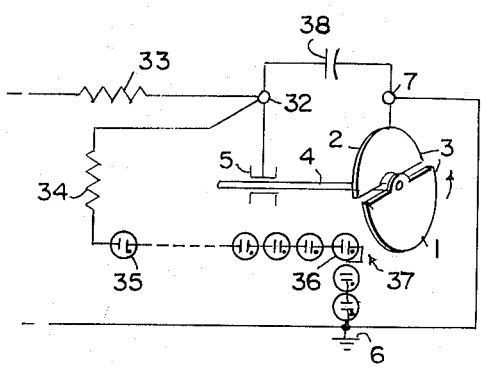
Figure 5:
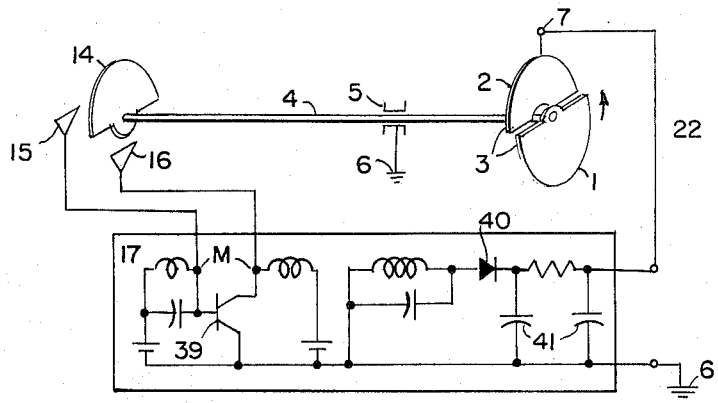
Figure 6:
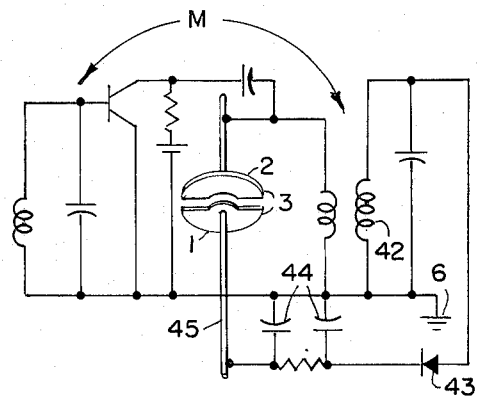
Figure 7:
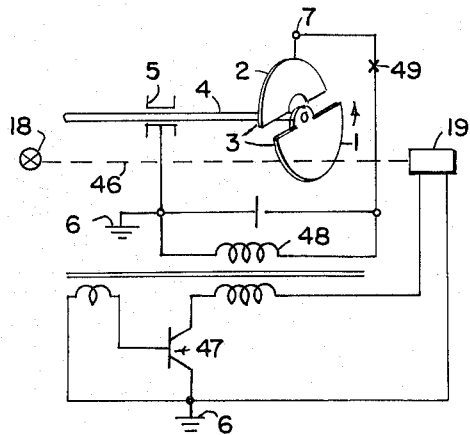

Other features and novel aspects of the invention will become more apparent when the following description is considered. I shall now describe my invention with reference to FIG. 1 is a perspective of the motor, showing suitable commutator arrangements, FIG. 2 is a perspective of the motor, showing a specific brush arrangement, FIG. 3 is a perspective of the motor, showing another specific brush arrangement, FIG. 4 is a perspective of the motor, showing electric field commutation by means of a gas-discharge lamp or tube, or a spark gap, FIG. 5 is a perspective of the motor, showing electronic triggering by means of a transistor oscillator, FIG. 6 is a circuit diagram of the motor, showing electronic triggering with the motor providing a variable capacitance tuning element, FIG. 7 is a perspective of the motor, showing how the modulation of a beam of radiation by the rotating motor provides commutation and yields the necessary power supply for the total system.

Figures 2, 3:
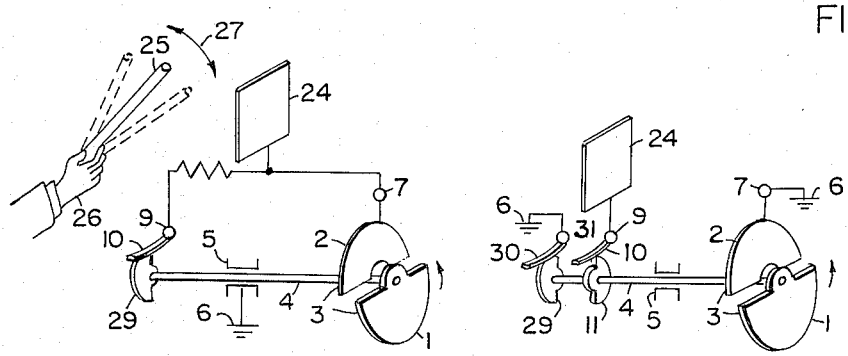

Referring to the drawings, the motor in FIG. 1 comprises a metal rotor vane 1 and a metal stator vane 2 of a variable capacitor 3; the rotor vane 1 being mounted on the metal shaft 4, supported by the bearing 5, which is connected to "ground" 6. While only one vane of each kind is shown, the variable capacitor may contain any number of vanes. Further, one or more additional variable capacitors, such as 1, 2, 3, with associated circuitry, may be mounted on the same shaft, displaced angularly a predetermined amount. Also, the vanes are not necessarily limited to 180°; if extending only to 90°, an additional set of two vanes may be inserted, and so on, so that the two-pole motor shown in FIG. 1 becomes extended to become a four-pole motor, a six-pole motor, and so on. The stator vane 2 is provided with a terminal 7. 8 represents the source of the direct or alternating driving voltage, with the terminals 7 and 9. The terminal 9 carries the brush 10, which engages the contact cam 11. The circuit is completed by the two resistors 12 and 13. At the other end of the shaft is arranged just one metal rotor vane 14, in the vicinity of which are mounted one or more capacitively coupled vanes 15, 16, connected to the triggered oscillator or balanced bridge 17. 18 represents a radiation source, such as a light source, and 19 the corresponding radiation detector, shown connected to 17 as another alternative of an input (see dotted lines). The output terminal 20 of the triggered oscillator is grounded, and the other terminal 21 is via the lead 22 connected to the stator vane terminal 7. It should be understood that the capacitor 3 may be shunted by a fixed capacitor whenever so is desirable.

The described electric field motor operates either with a brush 10, or as a brushless motor, with reference to 14. In the former case the operation is as follows. When brush 10 engages the contact cam 11, the circuit including the source 8 becomes closed, so that the rotor vane 1 by electric field attraction is sucked into (or across) the stator vane 2. After 180° movement, the brush disengages the contact cam 11, so that the circuit including the source 8 becomes interrupted, with the result that the electric field attraction disappears, so that the rotor vane 1 can continue freely through an additional 180° movement, whereupon the entire process is repeated. Thus continuous rotation obtains, and if additional sets of vanes, such as 1, 2 are mounted at right angle to the existing set, the electric-field motor will become self-starting. The resistor 12 is included as a protection for the source 8 in case of contact or spark-over between the vanes 1 and 2. The resistor 13 serves as a discharge resistor so that the capacitor becomes restored to uncharged condition once every turn.

In case of brushless operation the functioning is as follows. When the vane 14 engages the vane system 15, 16, the capacitive coupling between one or more such vanes and ground, or in-between vanes such as 15, 16, is changed, so that on- or off-triggering of 17 is accomplished. This is done so that the voltage is "on" when desired for electric field attraction, and "off" when free vane motion is desired. It follows that the function of 17 is to produce a properly timed pulse wave of electric charge, and that there is no necessity for the maintaining of any discharge resistor 13, since the commutation is fully secured by the appearance or disappearance of the pulses. Nor is there any requirement that the system be single-ended with ground 6, since a removal of ground 6 and replacement with ground 23 makes the system balanced to ground.

As another alternative, 17 may represent a passive device in form of a bridge, which is brought in and out of balance, or out and into balance, as the electric field configuration pertaining to the vanes 15 and 16 is being changed. When 18, 19 are used for triggering or bridge activation, the triggering effect is in principle the same as that obtained from 15, 16. As an example, the radiation cell 19 may directly produce one arm in a Wheatstone bridge, so that the radiation directly causes the bridge unbalance or balance. 17 may contain wave shaping and limiting nonlinear network elements, so as to provide a desirable time function output, for example a voltage which increases with capacitance.

FIG. 2 shows the arrangement for maintaining the motor in continuous operation from an antenna 24, picking up atmospheric electricity, the electric disturbance here being simulated by a man, waving an electrified rod 25 in the air with his hand 26. The back-and-forth motion of the rod is indicated by the arc 27. The antenna is connected to the terminal 7 of the stator vane 2, and is also connected via the resistor 28 to the terminal 9, and the brush 10, which engages the contact cam 29, positioned so that the circuit is interrupted when the rotor vane 2 engages the stator vane 1.

The motor shown in FIG. 2 works as follows. If it is assumed that the connection between the brush 9 and the cam 29 has just been interrupted, as the rotor vane 2 rotates in the direction of the indicated arrow, it follows that the antenna 24 and stator vane 2 are maintained at a certain instantaneous voltage with respect to ground, causing rotation of the rotor vane 1. After 180° rotation of the rotor vane 1, it becomes connected to ground 6 for discharge purposes via resistor 28, so that the rotor can freely rotate an additional 180°, whereupon the process is repeated.

FIG. 3 shows the motor in FIG. 1 in slightly different brush arrangement, with two brushes, and free from any permanent resistance shunt across the capacitor 3. Here the antenna 24 is connected to terminal 9, which carries the brush 10, while there is an additional brush 30, attached to the ground terminal 31, and engaging the contact cam 29.

The motor shown in FIG. 3 works as follows. As the rotor vane 1 rotates in the direction of the indicated arrow, a voltage is produced between the vanes 1 and 2 via the antenna 24, so that the rotational motion is maintained through 180°. At this point brush 10 disengages the contact cam 11, while brush 30, after a slight time interval, engages the contact cam 29, with the result that the charge on the stator is released, so that the rotor can move freely throughout the next 180°, whereupon the process is repeated.

FIG. 4 shows the same variable capacitor 3 as was used in FIG. 3, but terminal 7 of the stator vane 2 is now grounded and connected to one terminal 6 of the source, which is preferably a direct voltage source. The rotor vane 1 is via the shaft 4 connected to the other terminal of the source via the terminal 32 and the resistor 33. The variable capacitor 3 is shunted by the arrangement shown between terminals 32 and ground 6; the resistor 34 is series with a number of neon lamps, cold-cathode glow lamps, or the like, the number of lamps or tubes being dictated by the used voltage between terminals 32 and 6. One or more of the lamps or tubes are mounted in close vicinity 37, of the rotor vane 1, however in such a manner that the vane does not touch the glass envelope of the lamp or bulb or tube. The moving vane 1 is in close vicinity of the lamp or tube during 180° of its movement, namely the interval during which the rotor vane 1 is on its way out of the stator vane 2. The capacitor 38 produces a shunt capacitance in parallel with the capacitance of the variable capacitor 3.

The motor in FIG. 4 works as follows: The rotor vane 1 moves in the indicated direction, and as a relatively high voltage is applied to the stator vane 2, the motion is enhanced by the electric field attraction. In this interval, the string of lamps or tubes remains dark; at no time is the voltage sufficient to fire the lamps or bulbs. After 180° rotation the end of the rotor vane 1 appears in the vicinity 37 of one or more of the lamps or tubes, with the result that all of the lamps or tubes fire. The voltage between terminal 32 and ground 6 then abruptly falls to a low value, so that the rotor vane 1 can freely leave the stator vane 2. The firing is momentary, whereupon all lamps or tubes again become dark, but the voltage only gradually recovers full value, due to the appreciable time constant of the combination of the resistor 33 and the capacitors 3 and 38 in parallel. The time constant is roughly the inverse of the motor speed in turns per second. The firing occurs because of two reasons; first that the electric field to some extent changes the potential of the two electrodes in the lamp or tube most concerned, by means of stray admittance variation, secondly, that the electric field changes the ionization conditions inside the glass envelope, thus causing firing. For successful operation the supply voltage should be set to such a value that a small increase in this value causes audio frequency oscillations. Accordingly, this motor operates with highly constant speed, since the speed to a great extent is determined by the time constant.

In a simplified form of the motor shown in FIG. 4, the lamps or tubes are replaced by a spark gap, with the occurring spark discharging capacitor 3 once each rotation.

FIG. 5 shows a practical motor with a triggered oscillator for the achievement of automatic electronic commutation. This is the same illustration as that shown in FIG. 1, showing one suitable form of the unit 17. In FIG. 5, 17 contains the transistor oscillator 39, from which a radio frequency voltage of relatively large magnitude is extracted and rectified by means of the rectifier 40. Upon filtering in the filter 41, the derived voltage is applied to the terminal 7 of the stator 2 via the lead 22.

The motor shown in FIG. 5 works as follows: The metal vane 14 programs two intervals per rotation; one in which the oscillator oscillates, and the other one in which the oscillator does not oscillate. The oscillation interval is programmed to coincide with the movement of the rotor vane 1 from the indicated position, throughout 180°, so that the rectified or otherwise derived voltage causes electric field attraction in the capacitor 3, thus maintaining rotation. During the subsequent 180° interval, the oscillator output is zero, so that the rotor vane 1 can leave the stator vane 2 freely, whereupon the process is repeated. If the oscillation frequency of the oscillator is sufficiently low, no rectifier 40 and filter 41 is required. To make possible a low oscillation frequency, the oscillator 39 may be preceeded by a higher frequency oscillator, actuated by the vanes 15, 16, and triggering the following oscillator 39.

FIG. 6 shows a motor with commutation accomplished by the capacitor 3, performing the function of a tuning element, for example as part of a radio frequency transistor amplifier. The output tuning circuit employs the variable capacitor 3 and a radio frequency transformer with a high-voltage secondary winding 42, which via the rectifier 43 and filter 44 and lead 45 provides a direct voltage on the rotor vane 1 with respect to the stator vane 2.

The motor shown in FIG. 6 works as follows: When the tuning capacitor 3 has its minimum capacitance value, or is in such a position that the minimum value is approached, resonance and feedback conditions are such as to favor oscillations. Thus the transistor may already oscillate when the rotor vane 1 passes through the position shown in FIG. 6. Due to the necessary time delay, however, the direct voltage across the capacitor 3 does not appear until the rotor vane 1 begins to move into the stator vane 2, so that the applied voltage in this manner aids the movement of the rotor vane 1. As the capacitance increases, however, the resonance condition is lost, so that the oscillations vanish. Thus after a movement of 180°, when the moving vane 1 is beginning to disengage the stator vane 2, the voltage from the rectifier 39 has vanished, so that the rotor vane 1 can leave the stator vane 2 freely. After a total of 360° movement, the process repeats itself, so that continuous rotation obtains.

The arrangement of parametric operation needs no circuit diagram explanation, since the entire system consists of an alternating current generator, attached to the capacitor 3. As the rotor moves so as to increase the capacitance, the voltage across the capacitor 3 becomes reduced, but always in a delayed fashion, so that the major part of the dip in voltage occurs just after the point in the rotor 1 motion, when the entire rotor 1 is inside the stator 2. Thus the rotor can move out of the stator quite freely; there is a double-valued force-function, with a greater force pulling the rotor in, then holding it back when departing, with brush-free rotation as result. An inductance may be inserted in the system so that the resonance conditions aid, causing a still larger dip in the voltage when the rotor vane is attempting to leave the stator vane.

FIG. 7 shows a motor, utilizing automatic commutation by means of a beam of radiation 46 from the source 18 to the pickup cell 19, with the cell output also providing the operational power for the indicated transistor oscillator 47. 48 is a high-voltage winding, which supplies the driving voltage for the motor, and if a direct voltage is preferred, a rectifier is inserted at point 49.

The motor shown in FIG. 7 works as follows: If the rotor vane 1 is moving in the indicated direction, the radiation channel shown by the dotted line 46 is unimpeded, so that the radiation cell 19 receives full input. Accordingly, the transistor oscillator oscillates, with the required voltage developed across the transformer winding 48. After a movement of 120°, however, the radiation channel becomes interrupted by the rotor vane 1, disengaging the stator vane 2. Accordingly, the oscillator ceases to oscillate, so that the driving voltage vanishes from the stator 2, with the result that the rotor vane 1 disengages the stator vane 2 without difficulty. After completion of the following 180° interval, the process repeats itself. It should be noted that if the radiation cell 19 is replaced by an electric battery, the oscillating transistor serves as a converter from a low battery voltage to a high alternating, or rectified alternating voltage, with the programming making rotation possible. If in FIG. 7 the transistor oscillator is left out, and the radiation cell is substituted to furnish the voltage required on terminal 7, a motor results that derives its entire operational power from the incoming radiation.

While I have described preferred embodiments of my invention, it will be understood that many other modifications may be made without any departure from the basic scope and spirit of my invention. It is by no means limited to the specific details and particular arrangements shown and described above for the purpose of illustration, since many modifications and variations may be introduced without any departure from the scope and spirit of my invention. I wish therefore to be limited not by the foregoing description, but on the contrary, solely by the claims granted me.

What is claimed is:

1. Electromechanical transducing apparatus comprising,
   a controllable potential source having first and second terminals,
   means defining first and second conducting surfaces,
   means for supporting said first and second conducting surfaces for relative movement therebetween between a first position of relatively low capacity established by said first and second conducting surfaces and a second position of capacity higher than said relatively low capacity,
   means for continuously connecting said potential source first and second terminals to said first and second conducting surfaces respectively to establish an electric field therebetween when said potential source establishes a potential between said first and second terminals,
   means responsive to the relative position between said first and second conducting surfaces for delivering control signals to said potential source to change the potential between said first and second terminals in synchronism with relative movement between said first and second conducting surfaces,
   said potential source comprising,
   amplifying means responsive to a triggering signal for providing a high potential between said first and second terminals during selected time intervals synchronously related to said relative movement,
   and further comprising,
   means responsive to a reference one of said relative positions for providing a said triggering signal on each occurrence of said reference position,
   means for coupling each said triggering signal to said amplifying means,
   said amplifying means comprising an oscillatory circuit normally providing an A.-C. signal,
   and further comprising means responsive to each said triggering signal for blocking said A.-C. signal for a number of spaced time intervals corresponding to the number of said trigger pulses.

2. Electromechanical transducing apparatus in accordance with claim 1 wherein said first and second conducting surfaces comprise the frequency controlling capacity of said oscillatory circuit and assume a relative position establishing a capacity effective in extinguishing oscillations of said circuit.

References Cited by the Examiner
UNITED STATES PATENTS

| 735,621 | 8/1903 | Thomson | 318—116 |
| 993,561 | 5/1911 | Smith | 318—116 |
| 2,540,327 | 2/1951 | Felici | 310—6 |
| 2,542,494 | 2/1951 | Felici | 318—116 |
| 2,662,191 | 12/1953 | Okey | 310—6 |
| 2,975,307 | 3/1961 | Schroeder et al. | 310—6 |
| 2,980,839 | 4/1961 | Haeussermann | 318—254 |
| 3,023,348 | 2/1962 | Cox | 318—138 |

ORIS L. RADER, *Primary Examiner.*

JOHN F. COUCH, *Examiner.*